(12) United States Patent
Deng

(10) Patent No.: US 10,802,361 B2
(45) Date of Patent: Oct. 13, 2020

(54) ARRAY SUBSTRATE COMPRISING A LIGHT-SHIELDING ELECTRODE HAVING A MAIN SECTION WITH A VERTICAL PROJECTION COVERING A DATA LINE, LIQUID CRYSTAL DISPLAY PANEL AND LIQUID CRYSTAL DISPLAY DEVICE

(71) Applicant: SHENZHEN CHINA STAR OPTOELECTRONICS SEMICONDUCTOR DISPLAY TECHNOLOGY CO., LTD., Shenzhen, Guangdong (CN)

(72) Inventor: Zhuming Deng, Guangdong (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 398 days.

(21) Appl. No.: 15/742,419

(22) PCT Filed: Dec. 6, 2017

(86) PCT No.: PCT/CN2017/114702
§ 371 (c)(1),
(2) Date: Jan. 5, 2018

(87) PCT Pub. No.: WO2019/095459
PCT Pub. Date: May 23, 2019

(65) Prior Publication Data
US 2019/0155118 A1    May 23, 2019

(30) Foreign Application Priority Data
Nov. 17, 2017  (CN) .......................... 2017 1 1143234

(51) Int. Cl.
G02F 1/1362 (2006.01)
G02F 1/1339 (2006.01)
G02F 1/136 (2006.01)

(52) U.S. Cl.
CPC .... G02F 1/136209 (2013.01); G02F 1/13394 (2013.01); G02F 1/136286 (2013.01);
(Continued)

(58) Field of Classification Search
CPC .......... G02F 1/137; G02F 2001/13606; G02F 2001/136218; G02F 2001/13775; G02F 2001/13398; G02F 1/1676
See application file for complete search history.

(56) References Cited

U.S. PATENT DOCUMENTS

2012/0327337 A1* 12/2012 Waratani ........... G02F 1/133514
349/106
2013/0003008 A1* 1/2013 Okumoto .......... G02F 1/133514
349/155
(Continued)

FOREIGN PATENT DOCUMENTS

CN      102253538 A     11/2011
CN      102360143 A     2/2012
(Continued)

Primary Examiner — Paul C Lee
(74) Attorney, Agent, or Firm — Hemisphere Law, PLLC; Zhigang Ma (57) ABSTRACT

The present disclosure discloses an array substrate arranged opposite to a color filter substrate, the array substrate includes a first substrate, a data line, a spacer protruding from the first substrate, a light-shielding electrode located on a side of the data line away from the first substrate, wherein the light-shielding electrode includes a main section and a protruding section, the vertical projection of the main section on the first substrate covers the data line, the protruding section is stacked on the spacer, and the protruding section contacts the color filter substrate. The present disclosure (Continued)

further discloses a liquid crystal display panel and a liquid crystal display device. The influence of the high and low potential signals on the main section of the light-shielding electrode on the data line is reduced, the light-shielding electrode works normally, the product yield is high, and the production cost is saved.

10 Claims, 4 Drawing Sheets

(52) U.S. Cl.
CPC .............. *G02F 1/136227* (2013.01); *G02F 2001/13398* (2013.01); *G02F 2001/13606* (2013.01); *G02F 2001/136218* (2013.01); *G02F 2001/136222* (2013.01); *G02F 2201/121* (2013.01)

(56) References Cited

U.S. PATENT DOCUMENTS

| | | | |
|---|---|---|---|
| 2013/0016317 A1* | 1/2013 | Waratani | G02F 1/13394 349/155 |
| 2014/0063419 A1* | 3/2014 | Lo | G02F 1/134309 349/106 |
| 2015/0198851 A1* | 7/2015 | Park | H01L 27/124 349/46 |
| 2016/0124280 A1* | 5/2016 | Park | G02F 1/136286 349/43 |
| 2016/0209712 A1* | 7/2016 | Lee | G02F 1/134309 |
| 2016/0216585 A1 | 7/2016 | Tae | |

FOREIGN PATENT DOCUMENTS

| | | |
|---|---|---|
| CN | 102650770 A | 8/2012 |
| CN | 104062816 A | 9/2014 |
| CN | 106773394 A | 5/2017 |

\* cited by examiner

ARRAY SUBSTRATE COMPRISING A LIGHT-SHIELDING ELECTRODE HAVING A MAIN SECTION WITH A VERTICAL PROJECTION COVERING A DATA LINE, LIQUID CRYSTAL DISPLAY PANEL AND LIQUID CRYSTAL DISPLAY DEVICE

RELATED APPLICATIONS

The present application is a National Phase of International Application Number PCT/CN2017/114702, filed Dec. 6, 2017, and claims the priority of China Application CN 201711143234.1, filed Nov. 17, 2017.

FIELD OF THE DISCLOSURE

The present disclosure relates to a liquid crystal display technology field, and more particularly to an array substrate, a liquid crystal display panel and a liquid crystal display device.

BACKGROUND OF THE DISCLOSURE

The PSVA (Polymer Stabilized Vertically Aligned) mode liquid crystal display panel utilizes a vertical longitudinal electric field to drive liquid crystal molecules arranged vertically on the glass substrate to form a liquid crystal display panel in which the polymer is stable and arranged vertically. The liquid crystal display panel in this mode is in a black display state when no voltage is applied. After a certain voltage is applied, the liquid crystal molecules in the liquid crystal display panel are tilted in the horizontal direction, and the liquid crystal display panel in this mode is in a white display state.

In the prior art, in order to avoid light leakage on the side of the liquid crystal display panel caused by the black matrix bending, the existing PSVA mode curved liquid crystal display panel forms a light-shielding electrode on the data line, the light-shielding electrode effectively reduces the side light leakage phenomenon of the curved liquid crystal display panel. However, since the light-shielding electrode completely covers the data line, the light-shielding electrode is easily affected by the high and low potential signals on the data line, so that a voltage difference is generated between the light-shielding electrode and the common electrode on the color filter substrate, thereby causing light leakage on the side surface of the liquid crystal display panel.

SUMMARY OF THE DISCLOSURE

The technical problem to be solved by the present disclosure is to provide an array substrate, a liquid crystal display panel and a liquid crystal display device which solves the problem that the light-shielding electrode in the prior art is easily influenced by the high and low potential signals on the data line and affects the normal operation of the light-shielding electrode.

In order to solve the above technical problem, the present disclosure provides an array substrate, arranged opposite to a color filter substrate, the array substrate including:

a first substrate and a data line, the data line being arranged on the first substrate;

a spacer protruding from the first substrate and having a vertical projection on the first substrate not intersecting with the data line;

a light-shielding electrode located on a side of the data line away from the first substrate, wherein the light-shielding electrode includes a main section and a protruding section which are integrated with each other, a vertical projection of the main section on the first substrate covers the data line, the protruding section is stacked on the spacer, and the protruding section contacts the color filter substrate.

Wherein the array substrate further includes an auxiliary electrode and a pixel electrode arranged on the first substrate, a vertical projection of the auxiliary electrode on the first substrate is at least partially located between the data line and the pixel electrode, the auxiliary electrode is configured to reduce the influence of the data line on the pixel electrode, and the spacer is arranged on the auxiliary electrode.

Wherein the spacer includes a top surface and a first side wall surface connected between the top surface and the auxiliary electrode, the first side wall surface faces the light-shielding electrode, the protruding section extends from the first side wall surface to the top surface, and an end of the protruding section portion covers the top surface.

Wherein the first sidewall surface is oblique to the first substrate.

Wherein the array substrate further includes color resists, a portion of the color resists are formed on a surface of the first substrate for displaying image colors, and another portion of the color resists are stacked on the thin film transistor to form the spacer.

Wherein the spacer includes a first color resist and a second color resist, the first color resist and the second color resist are stacked and arranged on the first substrate in turn, the size of the vertical projection of the first color resist on the first substrate is larger than that of the second color resist.

Wherein the vertical projection of the spacer on the first substrate does not intersect with the thin film transistor.

The present disclosure further provides a liquid crystal display panel including a color filter substrate, a liquid crystal layer and an array substrate, the array substrate includes a first substrate and a data line, the data line being arranged on the first substrate; a spacer protruding from the first substrate and having a vertical projection on the first substrate not intersecting with the data line; a light-shielding electrode located on a side of the data line away from the first substrate, wherein the light-shielding electrode includes a main section and a protruding section which are integrated with each other, a vertical projection of the main section on the first substrate covers the data line, the protruding section is stacked on the spacer, and the protruding section contacts the color filter substrate, the color filter substrate is arranged opposite to the array substrate, the protruding section contacts the color filter substrate, the liquid crystal layer is located between the color filter substrate and the array substrate and liquid crystal molecules of the liquid crystal layer are changed according to a voltage difference between the color filter substrate and the array substrate.

Wherein the array substrate further includes an auxiliary electrode and a pixel electrode arranged on the first substrate, a vertical projection of the auxiliary electrode on the first substrate is at least partially located between the data line and the pixel electrode, the auxiliary electrode is configured to reduce the influence of the data line on the pixel electrode, and the spacer is arranged on the auxiliary electrode.

Wherein the spacer includes a top surface and a first side wall surface connected between the top surface and the auxiliary electrode, the first side wall surface faces the light-shielding electrode, the protruding section extends from the first side wall surface to the top surface, and an end of the protruding section portion covers the top surface.

Wherein the first sidewall surface is oblique to the first substrate.

Wherein the array substrate further includes color resists, a portion of the color resists are formed on a surface of the first substrate for displaying image colors, and another portion of the color resists are stacked on the thin film transistor to form the spacer.

Wherein the spacer includes a first color resist and a second color resist, the first color resist and the second color resist are stacked and arranged on the first substrate in turn, the size of the vertical projection of the first color resist on the first substrate is larger than that of the second color resist.

Wherein the vertical projection of the spacer on the first substrate does not intersect with the thin film transistor.

Wherein the color filter substrate includes a second substrate and a common electrode, the second substrate is opposite to the first substrate, the common electrode is located on a side of the second substrate facing the array substrate, the protruding section contacts the common electrode, and the deflection of the liquid crystal molecules of the liquid crystal layer is changed according to the voltage difference between the pixel electrode and the common electrode.

The present disclosure further provides a liquid crystal display device, including a backlight module and the liquid crystal display panel according to any one of the above, wherein the backlight module is arranged on the non-display surface side of the liquid crystal display panel to provide a backlight for displaying an image on the liquid crystal display panel.

The beneficial effects of the present disclosure are as follows: the spacer is supported between the array substrate and the color filter substrate, and plays a role of maintaining the distance between the array substrate and the color filter substrate, the protruding portion of the light-shielding electrode is stacked on the top of the spacer to make contact with the common electrode on the color filter substrate, that is, the light-shielding electrode is electrically connected to the common electrode. Since each of the light-shielding electrodes on the array substrate is electrically connected to the common electrode, the light-shielding electrodes have the same potential, the influence of the high and low potential signals on the main section of the light-shielding electrode on the data line is reduced, the light-shielding electrode works normally, the product yield is high, and the production cost is saved.

BRIEF DESCRIPTION OF THE DRAWINGS

To describe the technical solutions in the embodiments of the present application more clearly, the following briefly introduces the accompanying drawings required for describing the embodiments. Apparently, the accompanying drawings in the following description show merely some embodiments of the present application, and a person of ordinary skill in the art may still derive other drawings from these accompanying drawings without creative efforts.

DETAILED DESCRIPTION OF PREFERRED EMBODIMENTS

The technical solutions in the embodiments of the present application are clearly and completely described below with reference to the accompanying drawings in the embodiments of the present application. Apparently, the described embodiments are merely some but not all of the embodiments of the present application. All other embodiments obtained by a person of ordinary skill in the art based on the embodiments of the present application without creative efforts shall fall in the protection scope of this application.

Figure 1:
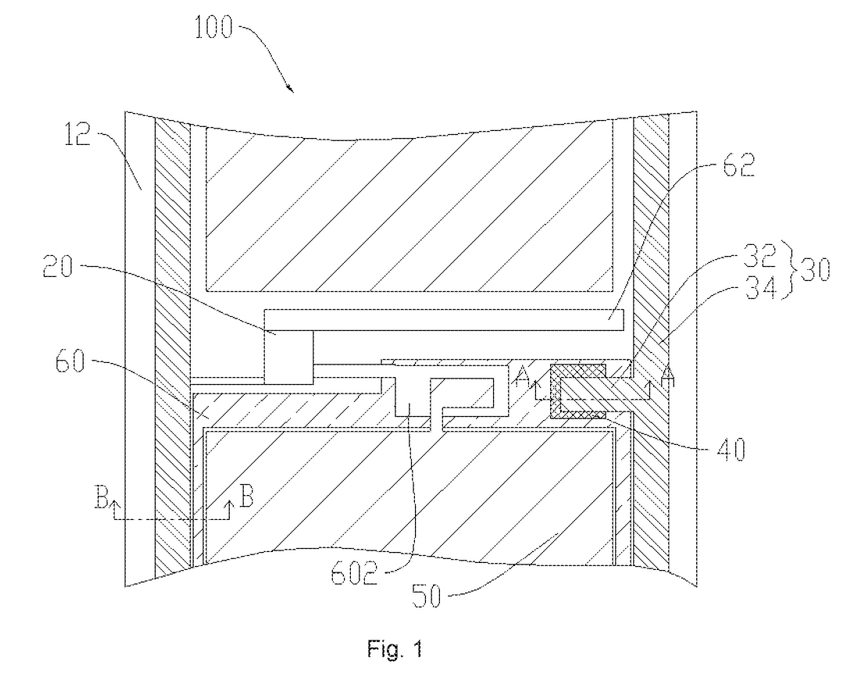
FIG. 1 is a schematic structural diagram of an array substrate according to Embodiment 1 of the present disclosure.
Figure 2:
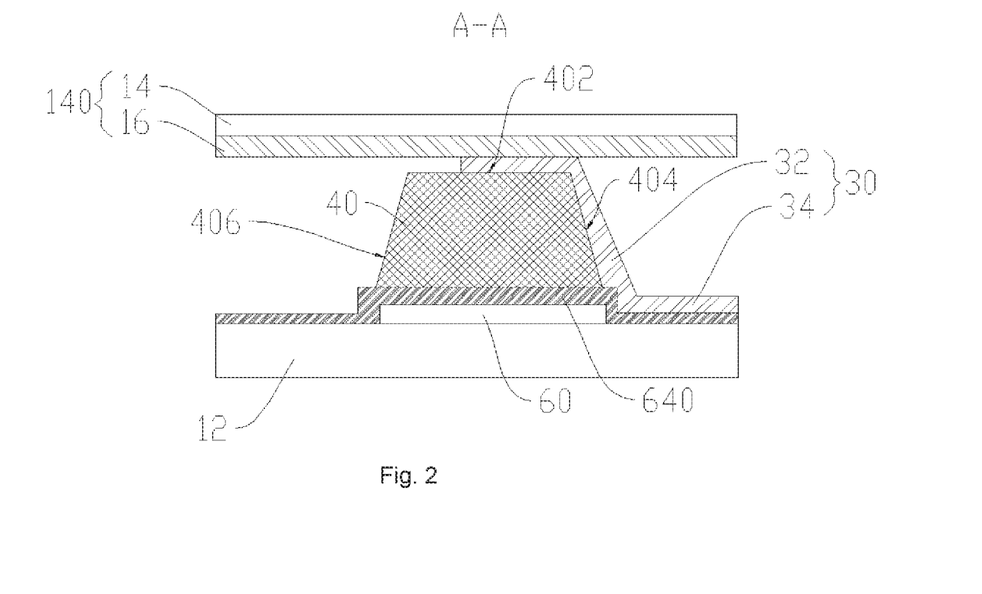
FIG. 2 is a cross-sectional view taken along A-A of the array substrate according to Embodiment 1 of the present disclosure.
Figure 3:
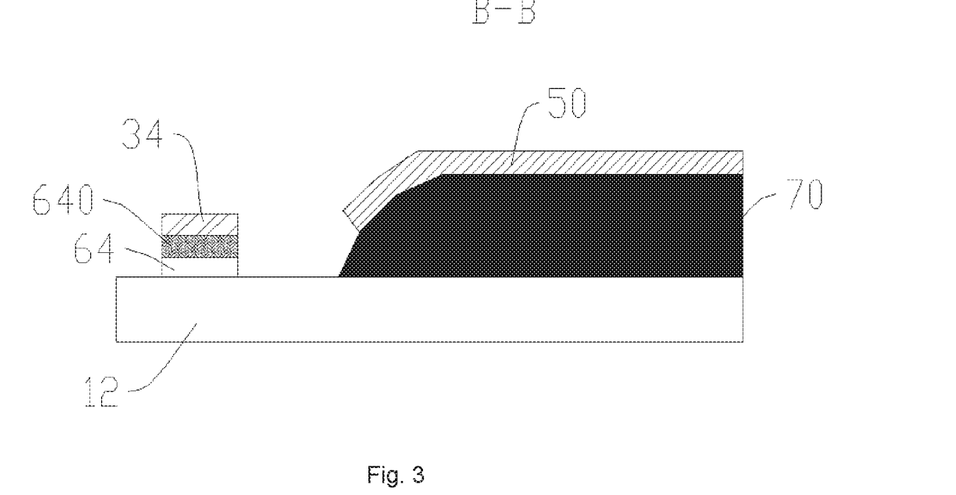
FIG. 3 is a cross-sectional view taken along B-B of the array substrate according to Embodiment 1 of the present disclosure.

Please also refer to FIG. 1, FIG. 2 and FIG. 3, the array substrate 100 according to the first embodiment of the present disclosure includes a first substrate 12, a thin film transistor 20, a data line 64, a scan line 62, and a pixel electrode 50. Wherein the array substrate 100 is applied to the PSVA mode liquid crystal display panel 200. As shown in FIG. 1, the thin film transistor 20, the data line 64, the scan line 62 and the pixel electrode 50 are all formed on the first substrate 12. The gate of the thin film transistor 20 is electrically connected to the scan line 62, the source and the drain of the thin film transistor 20 are electrically connected to one of the data line 64 and the pixel electrode 50, respectively. In the present embodiment, the data line 64 and the scan line 62 are alternately arranged, the thin film transistor 20 and the pixel electrode 50 are located in the pixel area enclosed by the scan line 62 and the data line 64. It should be noted that the data line 64 in FIG. 1 is shielded by the light-shielding electrode 30. Wherein the first substrate 12 is a flat substrate of a transparent material such as a glass substrate or a plastic substrate.

As shown in FIG. 2, the thin film transistors 20 are stacked on the surface of the first substrate 12. The array substrate 100 further includes spacers 40 protruding from the first substrate 12. Wherein the vertical projection of the spacers 40 on the first substrate 12 does not intersect with the data lines 64. The spacer 40 is a structure with a certain thickness formed by exposing, etching, or the like of an insulating material. In one embodiment, the spacer 40 contacts the color filter substrate 140 and the array substrate 100 to maintain the distance between the color filter substrate 140 and the array substrate 100, i.e., the cell thickness of the liquid crystal cell. In the present embodiment, the number of the spacers 40 is plural so as to support the large area color filter substrate 140 and the array substrate 100 from a plurality of positions, wherein the spacers 40 are arranged in an array, so that the positions of the color filter substrate 140 and the array substrate 100 are uniformly pressed, so as to prevent the thickness of the liquid crystal cell from being uneven. In one embodiment, the spacer 40 can be a cylinder, a cone, or a cube.

Referring to FIG. 1 and FIG. 3, the array substrate 100 further includes a light-shielding electrode 30. The light-shielding electrode 30 is located on a side of the data line 64 away from the first substrate 12. The light-shielding electrode 30 includes a main section 34 and a protruding section 32 interconnected as one main, the vertical projection of the main section 34 on the first substrate 12 covers the data line 64. Further, the data line 64 is insulated from the main section 34. Wherein the main section 34 is isolated by the insulating layer 640. In the present embodiment, the main section 34 is strip-shaped, and the main section 34 of each light-shielding electrode 30 covers a data line 64 to reduce side light leakage of the curved liquid crystal display panel 200. In the present embodiment, the protruding sections 32 are stacked on the spacer 40, and the protruding sections 32 contact the color filter substrate 140. Specifically, the protruding section 32 extends from one side of the main section 34 and extends along the surface of the spacer 40 to the top surface 402 of the spacer 40 to contact the color filter substrate 140. Since the color filter substrate 140 and the array substrate 100 are bonded together by the sealant, the sealant closely adheres the color filter substrate 140 and the array substrate 100 to each other, the spacer 40 closely contacts the surface of the color filter substrate 140 through the protruding section 32. Wherein the color filter substrate 140 includes a second substrate 14 and a common electrode 16 formed on the second substrate 14. The protruding section 32 contacts the common electrode 16 to achieve electrical connection between the light-shielding electrode 30 and the common electrode 16. When the high and low potential signals on the data line 64 change, the influence of the data line 64 on the light-shielding electrode 30 is alleviated by the common electrode 16, so that the potential stability of the light-shielding electrode 30 is improved. In the present embodiment, a plurality of light-shielding electrodes 30 are arranged on the array substrate 100, and only two adjacent light-shielding electrodes 30 are illustrated in FIG. 1.

The spacer 40 is supported between the array substrate 100 and the color filter substrate 140 and functions to maintain the distance between the array substrate 100 and the color filter substrate 140. The protruding section 32 of the light-shielding electrode 30 is stacked on the top of the spacer 40 so as to be in contact with the common electrode 16 on the color filter substrate 140, the light-shielding electrode 30 is electrically connected to the common electrode 16 to reduce the influence of the high and low potential signals on the data line 64 on the main section 34 of the light-shielding electrode 30. The light-shielding electrode 30 works normally, the product yield is high, and the production cost is saved.

In the present embodiment, referring to FIG. 1, the array substrate 100 further includes an auxiliary electrode 60 and a pixel electrode 50 arranged on the first substrate 12. The vertical projection of the auxiliary electrode 60 on the first substrate 12 is at least partially located between the data line 64 and the pixel electrode 50. The auxiliary electrode 60 serves to reduce the influence of the data line 64 on the pixel electrode 50. The array substrate 100 further includes a transition conductive layer 602 connected between the pixel electrode 50 and the source or the drain of the TFT 20. The auxiliary electrode 60 is at least partially opposite to the transition conductive layer 602 to form a storage capacitor. In the present embodiment, the spacer 40 is arranged on the auxiliary electrode 60. The auxiliary electrode 60 has a certain thickness by itself, reducing the thickness of the spacer 40 and saving a certain material cost. Wherein the surface of the auxiliary electrode 60 is further provided with an insulating layer 640. The insulating layer 640 covers the auxiliary electrode 60 to separate the auxiliary electrode 60 from other structures such as the spacer 40 to prevent the auxiliary electrode 60 from being short-circuited to the outside.

In the present embodiment, referring to FIG. 2, the spacer 40 includes a top surface 402 and a first sidewall surface 404 connected between the top surface 402 and the auxiliary electrode 60. The first side wall surface 404 faces the light-shielding electrode 30. The protruding portion 32 extends from the first side wall surface 404 to the top surface 402. The protruding portion 32 partially covers the top surface 402. The cross-section of the spacer 40 is rectangular, and the spacer 40 further includes a second sidewall surface 406 opposite to the first sidewall surface 404. The second side wall surface 406 is located on a side of the spacer 40 away from the main section 34. The protruding section 32 covers the first side wall surface 404 and the top surface 402 and does not cover the second side wall surface 406. The protruding portion 32 partially covers the top surface 402. Since the protruding portion 32 functions to be stacked on the top surface 402 of the spacer 40 to contact the color filter substrate 140, the protruding portion 32 only partially covers the top surface 402. Of course, increasing the contact area between the protruding portion 32 and the color filter substrate 140 can reduce the impedance between the light-shielding electrode 30 and the color filter substrate 140 (common electrode 16), which is beneficial to reduce the loss of the electrical signal.

In the present embodiment, referring to FIG. 2, the first sidewall surface 404 is oblique to the first substrate 12. Wherein the spacer 40 is tapered, that is, the top surface 402 of the spacer 40 is smaller in size than the bottom surface. The inclined first side wall surface 404 facilitates the extension of the protruding section 32 on the first side wall surface 404, and the protruding section 32 is not easily broken, resulting in a high yield.

The spacer 40 is supported between the array substrate 100 and the color filter substrate 140 and functions to maintain the distance between the array substrate 100 and the color filter substrate 140. The protruding section 32 of the light-shielding electrode 30 is stacked on the top of the spacer 40 so as to be in contact with the common electrode 16 on the color filter substrate 140, the light-shielding electrode 30 is electrically connected to the common electrode 16 to reduce the influence of the high and low potential signals on the data line 64 on the main section 34 of the light-shielding electrode 30. The light-shielding electrode 30 works normally, the product yield is high, and the production cost is saved.

Figure 4:
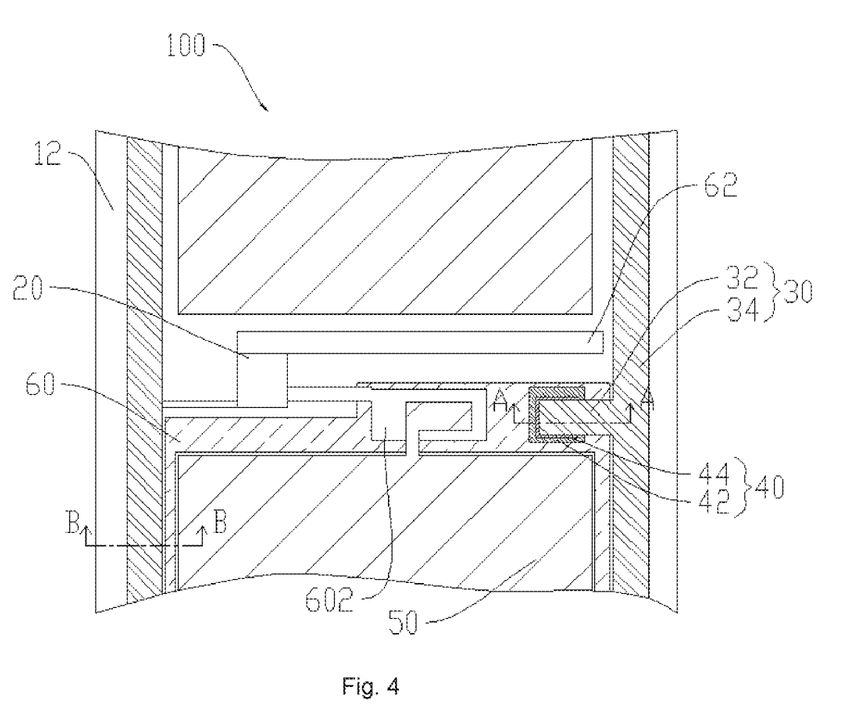
FIG. 4 is a schematic structural diagram of an array substrate according to Embodiment 2 of the present disclosure.
Figure 5:
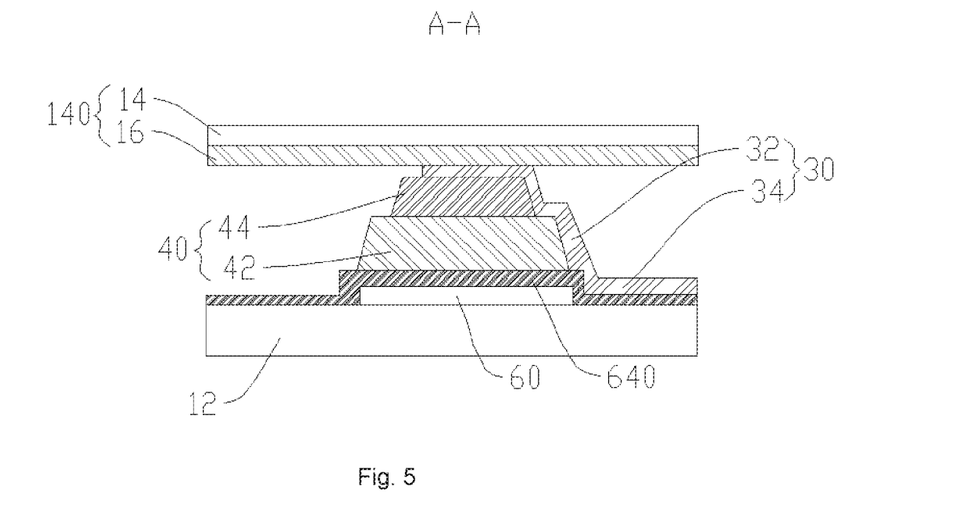
FIG. 5 is a cross-sectional view taken along A-A of the array substrate according to Embodiment 2 of the present disclosure.

Please referring to FIG. 4 and FIG. 5, The difference between the array substrate 100 provided in the second embodiment of the present disclosure and the first embodiment is that the spacer 40 is at least one color resist 70. In the present embodiment, the array substrate 100 is a COA substrate (Color Filter on Array). Specifically, the color resist 70 for forming a color image is arranged on the first substrate 12, and the color resist 70 is arranged between the pixel electrode 50 and the first substrate 12. During formation of the color resist 70, a portion of the color resist 70 is formed on the surface of the first substrate 12 for displaying a color image, another part of the color resist 70 is formed on the thin film transistor 20 to be used as the spacer 40, and the spacer 40 is formed without any additional process, thereby saving the manufacturing cost. In the present embodiment, the spacer 40 may be formed by stacking at least one color resist 70.

Referring to FIG. 5, in the present embodiment, the spacer 40 includes a first color resist 72 and a second color resist 74. The first color resist 72 and the second color resist 74 are sequentially stacked on the thin film transistor 20. The size of the vertical projection of the first color resist 72 on the first substrate 12 is greater than that of the second color resist 74. In an embodiment, the first color resist 72 is a red color resist 70, the second color resist 74 is a blue color resist 70, in another embodiment, the first color resist 72 and the second color resist 74 may also be other color resists 70 of different colors. In the present embodiment, the size of the vertical projection of the first color resist 72 on the first substrate 12 is greater than that of the second color resist 74. In other words, the two color resists 70 having different sizes are superposed to make the spacer 40 as a whole as a step, which is beneficial for maintaining the structural stability of the entire structure of the spacer 40 on the one hand. On the other hand, the height of the single color resist 70 (the first color resist 72 or the second color resist 74) is lower, which facilitates that the protruding sections 32 extend along the surface of the spacer 40, avoiding the ascending slope of the spacer 40 from being too large causes the protruding section 32 to be easily broken when the protruding section 32 extends on the surface of the spacer 40 to improve the manufacturing yield of the protruding section 32.

In one embodiment, the height of the first color resist 72 is greater than that of the second color resist 74, which is favorable for maintaining the structural stability of the overall structure of the spacer 40.

The spacer 40 is supported between the array substrate 100 and the color filter substrate 140 and functions to maintain the distance between the array substrate 100 and the color filter substrate 140. The protruding section 32 of the light-shielding electrode 30 is stacked on the top of the spacer 40 so as to be in contact with the common electrode 16 on the color filter substrate 140, the light-shielding electrode 30 is electrically connected to the common electrode 16 to reduce the influence of the high and low potential signals on the data line 64 on the main section 34 of the light-shielding electrode 30. The light-shielding electrode 30 works normally, the product yield is high, and the production cost is saved.

Referring to FIG. 1, the vertical projection of the spacer 40 of the array substrate 100 provided by the embodiment of the present disclosure on the first substrate 12 does not intersect with the thin film transistor 20. Specifically, the spacer 40 is spaced apart from the thin film transistor 20 by a great distance, that is, the protruding section 32 is far away from the thin film transistor 20, the mutual influence between the thin film transistor 20 and the protruding section 32 is small, both the light-shielding electrode 30 and the thin film transistor 20 can work normally, and the yield of the array substrate 100 is high.

Figure 6:
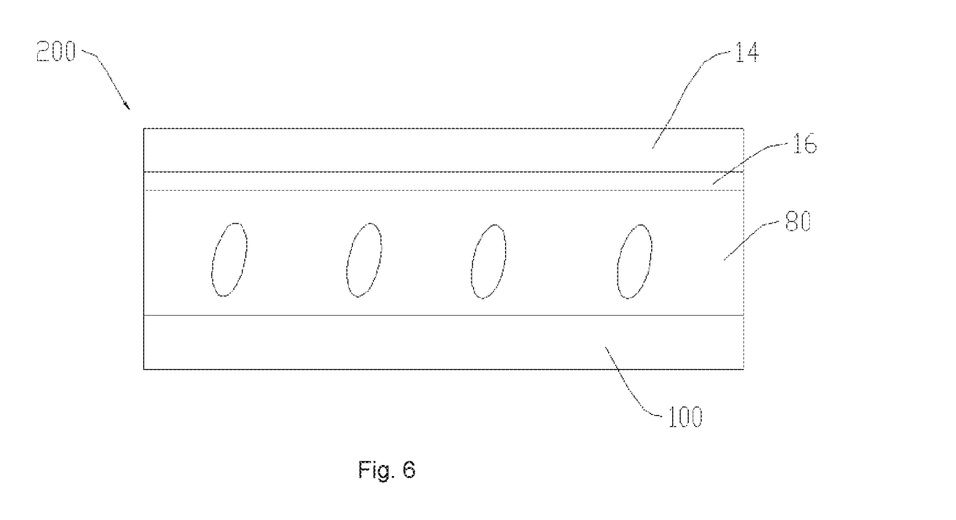
FIG. 6 is a schematic cross-sectional view of a liquid crystal display panel according to an embodiment of the present disclosure.

Please referring to FIG. 2 and FIG. 6, an embodiment of the present disclosure further provides a liquid crystal display panel 200 including a color filter substrate 140, a liquid crystal layer 80, and an array substrate 100 provided by the embodiments of the present disclosure, the color filter substrate 140 is arranged opposite to the array substrate 100, the protruding section 32 contacts the color filter substrate 140, the liquid crystal layer 80 is located between the pixel electrode 50 and the common electrode 16 and the liquid crystal molecule deflection of the liquid crystal layer 80 is changed according to the voltage difference between the pixel electrode 50 and the common electrode 16. The liquid crystal display panel 200 may be a curved display panel.

The color filter substrate 140 includes a second substrate 14 and a common electrode 16. The second substrate 14 is arranged opposite to the first substrate 12. The common electrode 16 is located on a side of the second substrate 14 facing the array substrate 100. The protruding portion 32 contacts the common electrode 16. Wherein the common electrode 16 is a conductive layer formed on the surface of the first substrate 12 by etching or the like. Actually, the sealant connecting the color filter substrate 140 and the array substrate 100 is provided with a plurality of contact points for electrically connecting the light-shielding electrode 30 and the auxiliary electrode 60 on the array substrate 100 to the common electrode 16 on the color filter substrate 140. Contact of the protruding section 32 of the light-shielding electrode 30 with the common electrode 16 increases the conduction point of the light-shielding electrode 30 and the common electrode 16, which is favorable for improving the stability of the light-shielding electrode 30.

Figure 7:
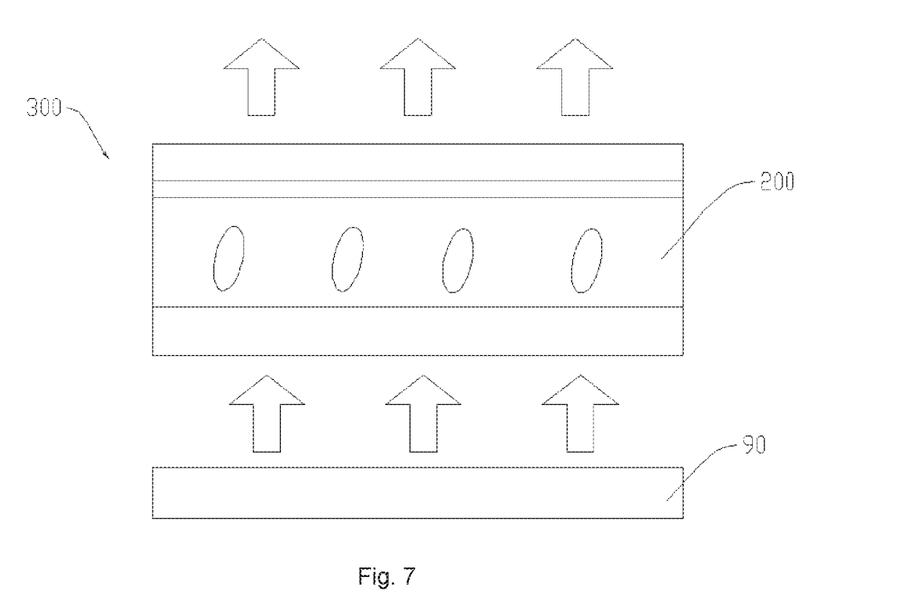
FIG. 7 is a schematic structural diagram of a liquid crystal display device according to an embodiment of the present disclosure.

Referring to FIG. 7, an embodiment of the present disclosure further provides a liquid crystal display device 300, which includes a backlight module 90 and a liquid crystal display panel 200 according to an embodiment of the present disclosure. the backlight module 90 is arranged on the non-display surface of the liquid crystal display panel 200 to provide a backlight for displaying images on the liquid crystal display panel 200, the liquid crystal display device 300 may be a curved display device. In the present embodiment, the liquid crystal display device 300 is a television, a display, a cell phone, a tablet, a notebook computer and the like.

The spacer 40 is supported between the array substrate 100 and the color filter substrate 140 and functions to maintain the distance between the array substrate 100 and the color filter substrate 140. The protruding section 32 of the light-shielding electrode 30 is stacked on the top of the spacer 40 so as to be in contact with the common electrode 16 on the color filter substrate 140, the light-shielding electrode 30 is electrically connected to the common electrode 16 to reduce the influence of the high and low potential signals on the data line 64 on the main section 34 of the light-shielding electrode 30. The light-shielding electrode 30 works normally, the product yield is high, and the production cost is saved.

The foregoing descriptions are merely specific implementation manners of the present application, but the protection scope of the present application is not limited thereto. Any equivalent modification or replacement can be easily conceived by any person skilled in the art within the technical scope disclosed in the present application, and these modifications or replacements should be covered within the protection scope of the present application. Therefore, the protection scope of the present application shall be subject to the protection scope of the claims.

What is claimed is:

1. An array substrate, arranged opposite to a color filter substrate, wherein the array substrate comprises:
   a first substrate and a data line, the data line being arranged on the first substrate;
   a spacer protruding from the first substrate and having a vertical projection on the first substrate not intersecting with the data line;
   a light-shielding electrode located on a side of the data line away from the first substrate, wherein the light-shielding electrode comprises a main section and a protruding section which are integrated with each other, a vertical projection of the main section on the first substrate covers the data line, the protruding section is stacked on the spacer, and the protruding section contacts the color filter substrate, wherein the array substrate further comprises an auxiliary electrode and a pixel electrode arranged on the first substrate, a vertical projection of the auxiliary electrode on the first substrate is at least partially located between the data line and the pixel electrode, the auxiliary electrode is configured to reduce the influence of the data line on the pixel electrode, and the spacer is arranged on the auxiliary electrode; or wherein the array substrate further comprises color resists, a portion of the color resists are formed on a surface of the first substrate for displaying image colors, and another portion of the color resists are stacked on the thin film transistor to form the spacer.

2. The array substrate according to claim 1, wherein when the array substrate comprises the auxiliary electrode, the spacer comprises a top surface and a first side wall surface connected between the top surface and the auxiliary electrode, the first side wall surface faces the light-shielding electrode, the protruding section extends from the first side wall surface to the top surface, and an end of the protruding section portion covers the top surface.

3. The array substrate according to claim 2, wherein the first sidewall surface is oblique to the first substrate.

4. The array substrate according to claim 1, wherein when the another portion of the color resists are stacked on the thin film transistor to form the spacer, the spacer comprises a first color resist and a second color resist, the first color resist and the second color resist are stacked and arranged on the first substrate in turn, the size of the vertical projection of the first color resist on the first substrate is larger than that of the second color resist.

5. A liquid crystal display panel, comprising a color filter substrate, a liquid crystal layer and an array substrate, the array substrate comprises a first substrate and a data line, the data line being arranged on the first substrate; a spacer protruding from the first substrate and having a vertical projection on the first substrate not intersecting with the data line; a light-shielding electrode located on a side of the data line away from the first substrate, wherein the light-shielding electrode comprises a main section and a protruding section which are integrated with each other, a vertical projection of the main section on the first substrate covers the data line, the protruding section is stacked on the spacer, and the protruding section contacts the color filter substrate, the color filter substrate is arranged opposite to the array substrate, the protruding section contacts the color filter substrate, the liquid crystal layer is located between the color filter substrate and the array substrate and liquid crystal molecules of the liquid crystal layer is changed according to a voltage difference between the color filter substrate and the array substrate, wherein the array substrate further comprises an auxiliary electrode and a pixel electrode arranged on the first substrate, a vertical projection of the auxiliary electrode on the first substrate is at least partially located between the data line and the pixel electrode, the auxiliary electrode is configured to reduce the influence of the data line on the pixel electrode, and the spacer is arranged on the auxiliary electrode; or wherein the array substrate further comprises color resists, a portion of the color resists are formed on a surface of the first substrate for displaying image colors, and another portion of the color resists are stacked on the thin film transistor to form the spacer.

6. The liquid crystal display panel according to claim 5, wherein when the array substrate comprises the auxiliary electrode, the spacer comprises a top surface and a first side wall surface connected between the top surface and the auxiliary electrode, the first side wall surface faces the light-shielding electrode, the protruding section extends from the first side wall surface to the top surface, and an end of the protruding section portion covers the top surface.

7. The liquid crystal display panel according to claim 6, wherein the first sidewall surface is oblique to the first substrate.

8. The liquid crystal display panel according to claim 5, wherein when the another portion of the color resists are stacked on the thin film transistor to form the spacer, the spacer comprises a first color resist and a second color resist, the first color resist and the second color resist are stacked and arranged on the first substrate in turn, the size of the vertical projection of the first color resist on the first substrate is larger than that of the second color resist.

9. The liquid crystal display panel according to claim 5, wherein the color filter substrate comprises a second substrate and a common electrode, the second substrate is opposite to the first substrate, the common electrode is located on a side of the second substrate facing the array substrate, the protruding section contacts the common electrode, and the deflection of the liquid crystal molecules of the liquid crystal layer is changed according to the voltage difference between a pixel electrode and the common electrode.

10. A liquid crystal display device, comprising a backlight module and the liquid crystal display panel according to claim 5, wherein the backlight module is arranged on the non-display surface side of the liquid crystal display panel to provide a backlight for displaying an image on the liquid crystal display panel.

* * * * *